United States Patent
Kroon et al.

(10) Patent No.: US 11,122,295 B2
(45) Date of Patent: Sep. 14, 2021

(54) APPARATUS AND METHOD FOR GENERATING AN IMAGE DATA BITSTREAM

(71) Applicant: KONINKLIJKE PHILIPS N.V., Eindhoven (NL)

(72) Inventors: Bart Kroon, Eindhoven (NL); Christiaan Varekamp, Veldhoven (NL); Patrick Luc Els Vandewalle, Out-Turnhout (BE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/959,208

(22) PCT Filed: Jan. 4, 2019

(86) PCT No.: PCT/EP2019/050183
§ 371 (c)(1),
(2) Date: Jun. 30, 2020

(87) PCT Pub. No.: WO2019/134979
PCT Pub. Date: Jul. 11, 2019

(65) Prior Publication Data
US 2020/0413097 A1    Dec. 31, 2020

(30) Foreign Application Priority Data
Jan. 5, 2018   (EP) ..................................... 18150423

(51) Int. Cl.
*H04N 19/597* (2014.01)
*H04N 19/166* (2014.01)
(Continued)

(52) U.S. Cl.
CPC ......... *H04N 19/597* (2014.11); *H04N 13/161* (2018.05); *H04N 19/166* (2014.11); *H04N 2013/0081* (2013.01)

(58) Field of Classification Search
None
See application file for complete search history.

(56) References Cited

U.S. PATENT DOCUMENTS

2010/0329358 A1   12/2010   Zhang et al.
2013/0057646 A1   3/2013    Chen et al.
(Continued)

FOREIGN PATENT DOCUMENTS

WO    20180234258 A1    12/2018

OTHER PUBLICATIONS

A. Collet et al. High-quality streamable free-viewpoint video. ACM Transactions on Graphics (TOG), Proceedings of ACM SIGGRAPH 2015. Volume 34 Issue 4, Aug. 2015.
(Continued)

*Primary Examiner* — Kate H Luo

(57) ABSTRACT

An apparatus comprises a store (201) storing a set of image parts and associated depth data for images representing a scene from different view poses (position and orientation). A predictability processor (203) generates predictability measures for image parts of the set of images for view poses of the scene. A predictability measure for a first image part for a first view pose is indicative of an estimate of the prediction quality for a prediction of at least part of an image for a viewport of the first view pose from a subset of image parts of the set of image parts not including the first image part. A selector (205) selects a subset of image parts of the set of image parts in response to the predictability measures, and
(Continued)

a bitstream generator (207) for generating the image bitstream comprising image data and depth data from the subset of image parts.

19 Claims, 8 Drawing Sheets

(51) Int. Cl.
*H04N 13/161* (2018.01)
*H04N 13/00* (2018.01)

(56) References Cited

U.S. PATENT DOCUMENTS

| | | |
|---|---|---|
| 2014/0092213 A1 | 4/2014 | Chen et al. |
| 2015/0178988 A1* | 6/2015 | Montserrat Mora ... G06T 13/40 345/420 |
| 2017/0148223 A1* | 5/2017 | Holzer ................. G06F 16/532 |
| 2018/0152688 A1* | 5/2018 | Graziosi ................ H04N 19/85 |
| 2019/0310472 A1* | 10/2019 | Schilt ................. H04N 21/2662 |
| 2019/0362151 A1* | 11/2019 | Stokking ............ H04N 21/6371 |

OTHER PUBLICATIONS

T. Ebrahimi et al., JPEG Pleno: Toward an Efficient Representation of Visual Reality, IEEE Multimedia, vol. 23, Issue 4, Nov. 2016.

International Search Report and Written Opinion from PCT/EP2019/050183 dated Mar. 8, 2019.

L. Toni "Correlation-Aware Packet Scheduling in Multi-Camera Networks" IEE Transactions on Multimedia vol. 16, No .2, Feb. 1, 2014 p. 496-509.

T. Maugey et al Reference View Selection in DIBR-Based Multiview Coding' IEEE Transactions on Image Processing, vol. 25, No. 4 Apr. 1, 2016 p. 1808-1819.

L. Toni et al "In-Network View Synthesis for Interactive Multiview Video Systems" IEEE Transactions on Multimedia, vol. 18, No. 5 May 1, 2016 p. 852-864.

I. Viola et al "ICME Grand Challenge on Light Field Image Compression" Oct. 24, 2016.

* cited by examiner

103

APPARATUS AND METHOD FOR GENERATING AN IMAGE DATA BITSTREAM

CROSS-REFERENCE TO PRIOR APPLICATIONS

This application is the U.S. National Phase application under 35 U.S.C. § 371 of International Application No. PCT/EP2019/050183, filed on Jan. 4, 2019, which claims the benefit of EP Patent Application No. EP 18150423.4, filed on Jan. 5, 2018. These applications are hereby incorporated by reference herein.

FIELD OF THE INVENTION

The invention relates to generating an image data bitstream and in particular, but not exclusively, to generating an image data bitstream providing an adaptive three-dimensional representation of the scene.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction (the viewing pose) of the viewer, such as for example allowing the viewer to move and "look around" in the scene being presented.

Such a feature can specifically enable a virtual reality experience being provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications for computers and consoles, such as in the game category of first person shooters.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

A major issue in supporting various services based on, in particular three dimensional, representations of a scene is that a large amount of data is required. This results in high resource requirements, such as a need for large storage resources. However, in many scenarios, the biggest constraint is not storage or processing requirements but communication requirements. If it is required that the data representing the scene must be communicated over a bandwidth limited communication channel (whether internal or external), it is highly desirable to try to reduce the amount of data that needs to be communicated.

For example, in many scenarios and for many applications, a client server approach may be used wherein a remote client executing e.g. a virtual reality application is coupled to a central service that provides the required scene data over a bandwidth limited link. A multi-view representation will however typically be associated with a high bitrate (even without depth information a high bitrate is required, and indeed this may often be even higher in this case as more views will be needed). For instance, virtual reality playback with motion freedom will require different views of a scene at the speed that the observer is moving through 3D space. The challenge of providing sufficient data over such a communication channel is very difficult to address in practice Several formats have been proposed for efficient streaming of 3D geometry and texture information over bandwidth limited communication channels, and especially for use with networks, such as the Internet. For example, the MPEG Omnidirectional MediA Format (OMAF) standard will include tiled streaming of 360 video (3 Degrees of Freedom (DoF))) which makes use of Dynamic Adaptive Streaming over HTTP (MPEG DASH). A future version of OMAF is expected to support limited motion parallax (3DoF+).

As mentioned, in practice, the most urgent problem in multi-view with depth coding is often not the storage requirement but rather the transmission bandwidth and latency. In order to have a smooth experience, images should arrive in time at the headset. However, although the developed formats and encodings seek to reduce the data rate, it is still typically the main limitation on the quality and user experience that can be achieved at the client side.

Hence, an improved approach for generating and using image data bitstreams would be advantageous. In particular, an approach that allows improved operation, facilitated operation, improved representation of a scene, increased flexibility, facilitated implementation, facilitated operation, reduced data volume, reduced data storage, distribution, and/or processing resource requirements, improved adaptability, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided apparatus for generating an image data bitstream, the apparatus comprising: a store for storing a set of image parts and associated depth data representing a scene from different view poses; a predictability processor for generating predictability measures for image parts of the set of image parts for view poses of the scene, a predictability measure for a first image part for a first view pose being indicative of an estimate of a prediction quality for a prediction of at least part of an image for a viewport of the first view pose from a first subset of image parts of the set of image parts not including the first image part; a selector for selecting a second subset of image parts of the set of image parts in response to the predictability measures; and a bitstream generator for generating the image bitstream comprising image data and depth data from the first subset of image parts.

The invention may provide an improved generation of a bitstream providing a representation of a scene, such as e.g. providing an adaptive three dimensional representation of a scene, e.g. for virtual reality applications. The approach may provide for a reduced complexity in many scenarios. It may in many scenarios provide a substantially reduced data rate for the bitstream and/or an improved quality. An improved quality/data rate trade-off can be achieved in many scenarios.

The predictability measure for an image part and view pose may be indicative of a quality of a prediction of an image part for an image of the scene for that view pose where the prediction is performed within using the image part for which the predictability measure is determined.

The associated depth data for an image part may be depth data which indicates distances from a view point for the image part to objects in the image part.

In accordance with an optional feature of the invention, the predictability processor is arranged to generate the predictability measure for the first image part as indicative of a prediction quality of a prediction of the first image part.

This may provide particularly efficient and high performance operation in many scenarios and embodiments. It may provide an improved adaptation of the bitstream to the specific properties of the scene and/or the usage of the bitstream.

The predictability measure for a first image part may be indicative of the quality of a prediction of the first image part from one or more other image parts of the stored set of image parts.

In accordance with an optional feature of the invention, the first subset of image parts includes only image parts included in the bitstream.

This may provide particularly efficient and high performance operation in many scenarios and embodiments, and may specifically allow an approach where image parts are provided as and when additional data is required in order for a receiver of the bitstream to synthesize view images of sufficient quality.

In accordance with an optional feature of the invention, the selector is further arranged to select the second subset of image parts in response to a visibility measure for the set of image parts for a target view pose.

This may provide particularly efficient and high performance operation in many scenarios and embodiments. It may provide an improved adaptation of the bitstream generation to the specific properties of the scene and/or the usage of the bitstream.

In accordance with an optional feature of the invention, the image parts are pre-encoded image parts.

This may provide a particularly efficient approach and may substantially reduce the computational requirement of the apparatus in order to generate the bitstream. For example, the image parts may be encoded once and the stored encoded image parts may then be reused each time a bitstream is subsequently generated.

The apparatus may be arranged to retrieve encoded image parts from the store and include it in the bitstream without any image encoding or transcoding of the image part.

In accordance with an optional feature of the invention, the set of image parts comprises faces of polyhedral projections of the scene for different view poses.

This may provide particularly efficient and high performance operation in many scenarios and embodiments. It may further allow compatibility with many other image processing algorithms.

In accordance with an optional feature of the invention, the image parts correspond to a predetermined partitioning of the images.

This may provide improved performance in many embodiments, and may in many embodiments provide a more efficient selection of data particularly useful for a view synthesis based on the bitstream.

In accordance with an optional feature of the invention, the apparatus further comprises a partitioner for generating at least some image parts of the set of image parts in response to a partitioning of images based on at least one of pixel values of the images and depth values for the images.

This may provide particularly efficient and low complexity operation in many scenarios and embodiments. It may further allow compatibility with many other image processing algorithms.

In accordance with an optional feature of the invention, at least some image parts of the set of image parts are image parts of a texture atlas image that includes texture parts from mesh and texture representations of the scene.

This may provide particularly efficient and high-performance operation in many scenarios and embodiments. It may further allow compatibility with many other image processing algorithms.

In accordance with an optional feature of the invention, the selector is arranged to select image parts for the second subset of image parts in response to a target view pose received from a remote source.

This may provide particularly attractive operation in many embodiments and may e.g. allow a system wherein the apparatus may dynamically generate a bitstream that provides the most essential information to e.g. a virtual reality application in which a virtual viewer moves in the scene.

In accordance with an optional feature of the invention, the selector is arranged to select a plurality of contiguous image parts in response to a determination that the plurality of contiguous image parts form a region having a prediction quality measure below a first threshold for an interior part of the regions and a prediction quality measure above a second threshold for a border part of the region.

This may provide particularly efficient and high-performance operation in many scenarios and embodiments.

In accordance with an optional feature of the invention, at least some image parts are overlapping.

This may provide particularly efficient and high-performance operation in many scenarios and embodiments.

In accordance with an optional feature of the invention, the predictability processor is arranged to generate the predictability measure for the first image part in response to the associated depth data for the first image part.

This may provide a particularly advantageous predictability measure in many embodiments and may e.g. allow a low complexity implementation which still allows a very accurate and efficient adaptation.

According to an aspect of the invention there is provided a method of generating an image data bitstream, the method comprising: storing a set of image parts and associated depth data representing a scene from different view poses; generating predictability measures for image parts of the set of image parts for view poses of the scene, a predictability measure for a first image part for a first view pose being indicative of an estimate of a prediction quality for a prediction of at least part of an image for a viewport of the first view pose from a first subset of image parts of the set of image parts not including the first image part; selecting a second subset of image parts of the set of image parts in response to the predictability measures; and generating the image bitstream comprising image data and depth data from the first subset of image parts.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to generation of an image data stream for a virtual reality application. However, it will be appreciated that the invention is not limited to this application but may be applied in e.g. many different image processing and rendering applications.

Figure 1:
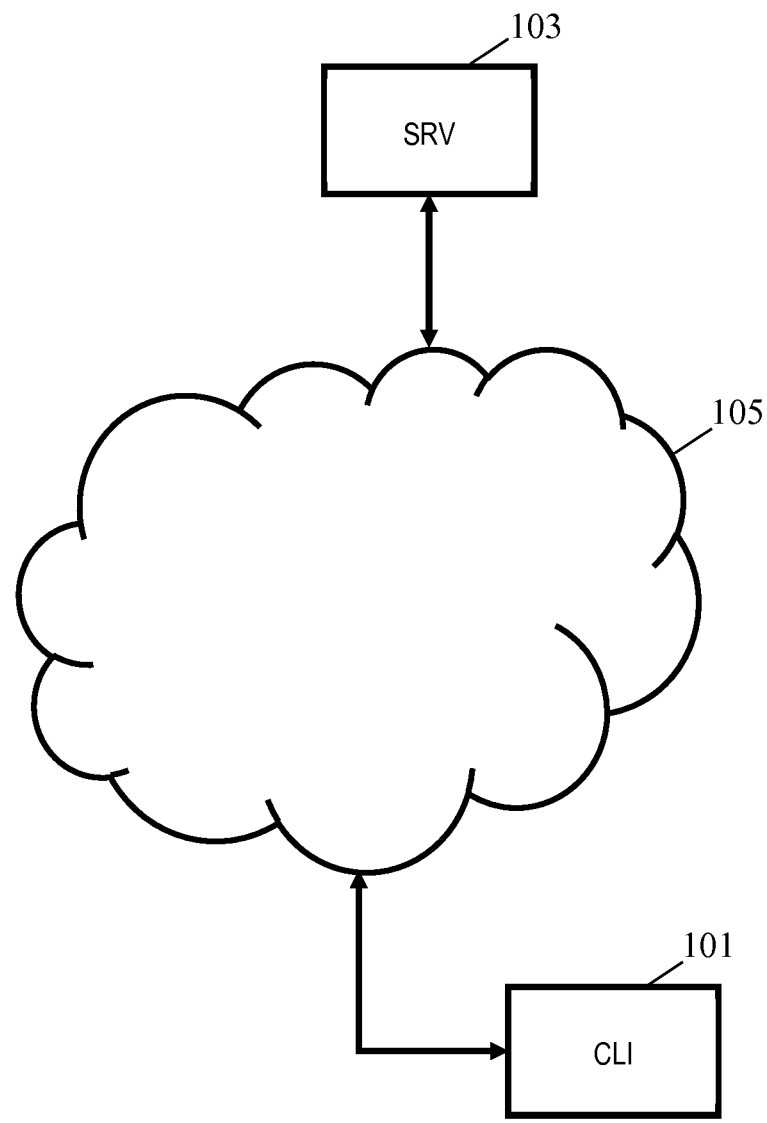
FIG. 1 illustrates an example of elements of an image processing system in accordance with some embodiments of the invention.

FIG. 1 illustrates an example of a system that may embody examples and variants of embodiments of the inventive concept.

In the example, a client in the form of an image rendering apparatus 101 is arranged to generate images representing a scene from different viewpoints, i.e. images corresponding to different viewports for different view poses of the scene may be generated. The image rendering apparatus 101 is arranged to receive an image data bitstream which comprises image parts as well as associated depth thereby providing a partial three-dimensional image representation of a scene. It may then, based on the received data, generate the appropriate images corresponding to the given viewport and pose. In the example, the image data bitstream is received from a bitstream generating apparatus 103 which operates as a remote server. The bitstream generating apparatus 103 is arranged to provide the image data bitstream via a network 105 which may for example be the Internet. In the specific example, the remote server 103 is a virtual reality server which provides three-dimensional image data representing a three-dimensional environment for the image rendering apparatus 101 to generate views corresponding e.g. to a virtual user's movement in the environment.

In the field, the terms placement or a pose is used as a common term for position and/or direction/orientation and the combination of the position and direction/orientation of e.g. an object, a camera, or a view is indeed typically referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following the term pose is used to refer to a position and/or orientation which may be represented by one to six values (corresponding to the maximum possible degrees of freedom). The description will focus on embodiments and examples where a pose has the maximum degrees of freedom, i.e. three degrees of freedom of each of the position and the orientation resulting in a total of six degrees of freedom (6DoF). The pose may thus be represented by a set or vector of six values representing the six degrees of freedom and thus the pose vector may provide a three-dimensional position and/or a three-dimensional direction indication. However, it will be appreciated that in other embodiments, the pose may be represented by fewer values.

In many applications, the three-dimensional image representation of the scene present at the server may be generated from a capture of a real-world scene or environment using e.g. depth sensing cameras. This allows for visual properties to be captured together with three-dimensional information. In order to capture a scene sufficiently, the use of an often very high number of captures corresponding to different view poses is adopted. In some applications, several 100s or even 1000s of images (with associated depth information) may be used to provide an accurate and detailed representation of the entire scene from different view poses.

The virtual data representation of a scene is a critical factor in providing an advantageous user experience. It is required that the data describing the scene provides an accurate representation of both the visual properties as well as the spatial properties. At the same time, it is critical to reduce the amount of data needed to represent the scene as this in many applications tends to be a limiting factor for the quality that can be achieved.

In particular, it is required that sufficient information is provided to the image rendering apparatus 101 to allow it to locally generate suitable images corresponding to the desired view poses, e.g. by performing view point shifting as will be known to the person skilled in the art. However, at the same time, it is required that the amount of data transmitted is kept low and that latency is kept at a low level. In many scenarios, the limited communication bandwidth is the restrictive factor in seeking to provide a high quality user experience with high quality and low latency.

In addition, the conversion from the captures of the depth sensing cameras to a data representation of the environment/scene is often very challenging and may introduce errors or artefacts. For example, in some applications, the captured data may be used to develop a three-dimensional model of the real-world scene. View images for a user being provided with a three-dimensional virtual reality experience may then be generated by evaluating the model from a specific viewpoint. In other applications, images for specific viewports or viewpoints may directly be generated from the captured images and depth information, e.g. by selecting one or more of the closest captured images and performing viewpoint shifting to correspond to the desired viewpoint, or in some cases by directly using the captured images.

In the present case, the scene is represented in the image domain by a set of images together with depth data. In many embodiments, the images may provide visual information reflecting the view of a given viewpoint for a given view pose and the depth data may represent the depth of pixels or objects in the image. Specifically, each image may correspond to a given capture for a given view pose for the scene with the depth data being an accompanying depth map as will be known to a skilled person. In some embodiments, the images may e.g. be texture atlas images or texture maps, and the depth data may be meshes providing a mesh and texture representation of the scene, as will be described in more detail later.

The bitstream generating apparatus 103 may accordingly comprise images and associated depth data representing the scene from a set of view poses, and specifically the images and depth data may be captured data. The bitstream generating apparatus 103 accordingly stores a representation of the 3D scene by a set of images with depth for a discrete set of view poses. The view poses for which such images are available will also be referred to as anchor view poses and the images will be referred to as anchor view images.

The images may further be divided into image parts and typically the bitstream generating apparatus 103 may comprise a large set of anchor image parts for the anchor poses. In some embodiments, the image parts may be generated by (actively) segmenting or dividing anchor images. In other embodiments, an image part may e.g. comprise all data available for a given anchor pose, i.e. the image part may be the entire image for a given anchor.

The bitstream generating apparatus 103 accordingly comprises a (potentially partial but often substantially complete) three-dimensional image representation of the scene by a set of image parts and associated depth maps.

For each light intensity/texture image part, the bitstream generating apparatus 103 stores an associated depth map providing depth information for the pixels of the light intensity/texture image parts. The depth map may typically comprise depth values that are indicative of the distance from a given view position to the object at the viewing direction corresponding to the position of the depth value. A depth value may e.g. have an increasing value for an increasing distance from the viewpoint to the object or may have a decreasing value for an increasing distance from the viewpoint to the object. The depth values may in many embodiments be provided as disparity values.

The provision of both depth and image (texture) information may provide additional information allowing improved processing by the image rendering apparatus 101. In particular, it may allow, or facilitate or improve, generation of view images for other view poses than the anchor view poses.

In order to facilitate such processing, it is desired that the distance between view poses is as small as possible. Specifically, a large spacing between anchor poses results in visible de-occlusion areas and requires very accurate depth maps or mesh models for the synthesis of intermediate views. A render unit can fill in the de-occlusion areas by combining multiple anchors, but this requires more resources for transmission, decoding and rendering and tends to reduce quality.

However, a small spacing between anchors leads to an increase in bitrate which typically is particularly high for applications such as Virtual Reality applications allowing free movement. The reason for this is that (in contrast to normal video), a light field with depth varies as a function of three spatial dimensions. This means that the coding cost of fixed elements (not residue) is high due to the high-dimensionality of the data.

In the system of FIG. 1 an improved approach may be provided wherein image parts and associated depth data is adaptively selected and included in the bitstream depending on a predictability measure.

Figure 2:
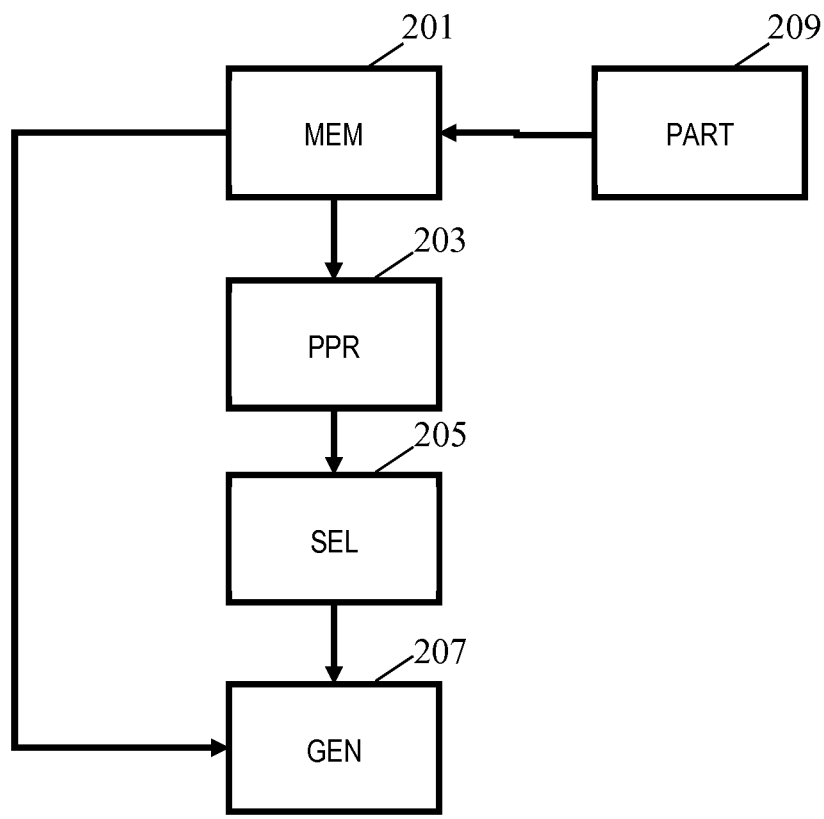
FIG. 2 illustrates an example of a bitstream generating apparatus in accordance with some embodiments of the invention.

FIG. 2 illustrates examples of some elements of the bitstream generating apparatus 103.

In the example, the bitstream generating apparatus 103 comprises a store 201 which stores the set of image parts and associated depth data.

The bitstream generating apparatus 103 further comprises a predictability processor 203 which is arranged to generate predictability measures for the image parts of the set of images. The predictability measures may be generated for view poses of a scene. The predictability for a given image part and view pose is generated to be indicative of the quality of a prediction of (all or part of) an image which corresponds to a view port for the given view pose based on a subset of image parts that do not include the image part for which the predictability measure is generated.

Thus, a predictability measure is generated for a given view pose and a given image part which reflects how well an image part for a view port of that view pose can be predicted from image parts of the set but excluding the image part for which the predictability measure is generated.

For example, a predictability measure may be generated for a given image part for a view pose which corresponds to a current target view pose from the client. This predictability measure may accordingly indicate how well the image for the view pose can be predicted if the given image part is not used.

As another example, a predictability measure may be generated for a given image part for the view pose of that image part. This predictability measure may specifically in such a case indicate how well the given image part itself can be predicted from other image parts of the set of stored image parts.

In many embodiments, predictability measures may be generated for a plurality or possibly all stored image parts and/or a plurality of predictability measures may be generated for each image part (corresponding to different view poses). In some embodiments, all predictability measures may be generated once, and potentially prior to starting the specific application. In some embodiments, the predictability measures may be generated dynamically as and when they are needed.

The predictability processor 203 is coupled to a selector 205 which is arranged to select a subset of image parts of the set of image parts in response to the predictability measures. For example, the selector 203 may select some image parts for which the predictability measures are low but not image parts for which the predictability measures are high.

The selector 205 is coupled to a bitstream generator 207 which is arranged to generate the image bitstream to comprise the image data and depth data from the subset of image parts. However, if a given image part is not selected to be included in the subset (but is selected to be excluded therefrom), the image part will not be included in the bitstream.

The subset of image parts from which the predictability measure is generated may be different in different embodiments. For example, it may in many embodiments include image parts (only) selected from image parts that are already included in the bitstream and thus the predictability measure for a given pose and image part may reflect the predictability of images for that pose based on image parts that have already been provided to the client.

In other embodiments, the subset may e.g. be determined in accordance with a fixed requirement. For example, the subset used to determine the predictability measure for a given image part for the pose of the image part may be selected as the nearest N image parts.

It will also be appreciated that different approaches for generating the subset of image parts may be used in different embodiments. For example, in some embodiments, a dynamic and sequential approach may be used. For example, during operation, a target view pose indication may be received from the client. The bitstream generating apparatus 103 may then proceed to generate a predictability measure for the pose for each image part in a neighborhood around the pose (e.g. for the N nearest image parts) where the prediction is based only on image parts that have already been transmitted to the image rendering apparatus 101. The selector 205 may then select the image part which has the lowest predictability measure and include this in the subset of image parts that will be (or have been) included in the bitstream. It may further determine if the predictability measure is indicative of a sufficiently high prediction quality for the given target pose. If not, the process may be repeated but this time the just included image part is also included in the subset of base image parts used for the prediction. Thus, the bitstream generating apparatus 103 may iteratively add nearby image parts until the desired target viewport can be predicted with sufficiently high quality.

In some embodiments, each image part is not necessarily considered individually. For example, in some embodiments, a common predictability measure may be generated for a part of the scene covered by a plurality of poses and image parts (for example based on considering contents/properties of a scene such as the number of objects in view, as will be described in more detail later).

Similarly, the selection is not necessarily based on considering only the predictability measure for a given image part. For example, in some embodiments, the spatial density of the poses for the image part that are selected may depend on a neighborhood predictability measure (typically common to a number of image parts). As an example, in regions where the predictability measure is considered to be high (e.g. due to a consideration that the complexity of the scene is low), image parts may be included for every third anchor view position. In contrast, where the predictability measure is considered to be low (e.g. due to a consideration that the complexity of the scene is high), image parts for all anchor view positions may be selected to be included in the bitstream.

The approach may provide for an adapted and improved generation of a bitstream with reduced overall data rate yet which still allows the image rendering apparatus 101 to generate the required views for the given view poses and at the required quality level. The approach may reduce redundancy in transmitted data and thereby improve the quality to bitrate ratio (FIG. 1).

Figure 3:
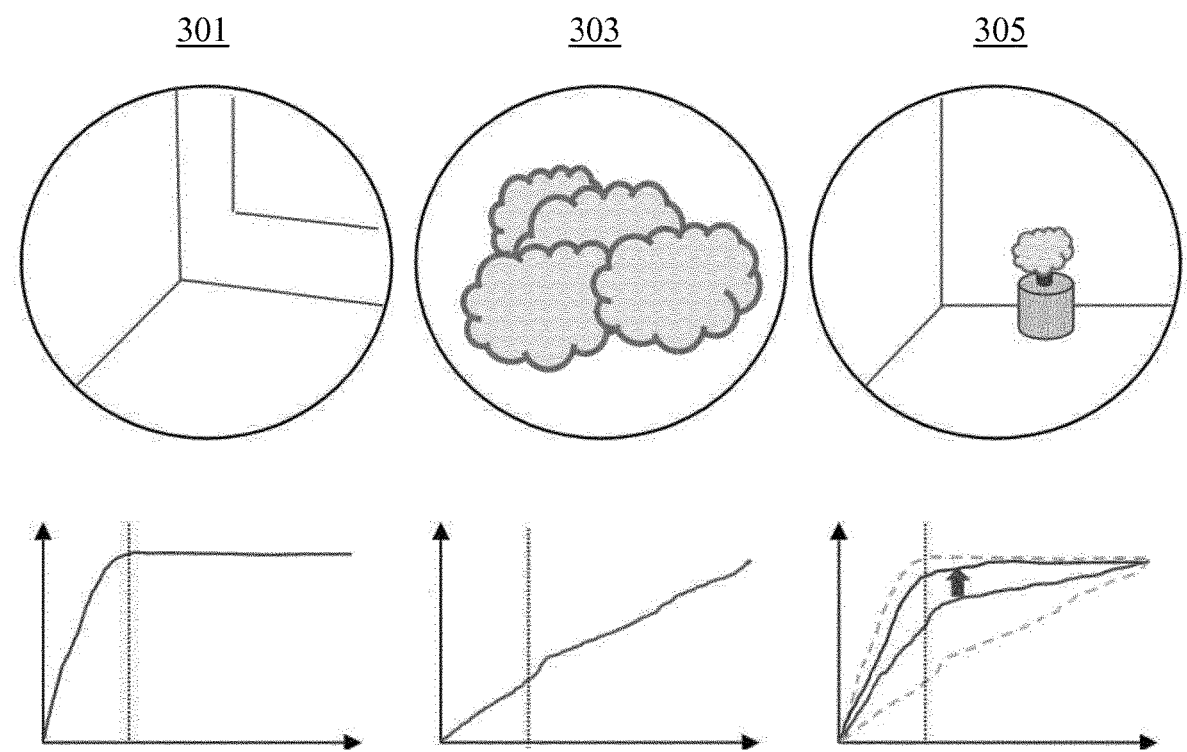
FIG. 3 illustrates an example of scenes and associated prediction quality properties.

For example, the example of FIG. 3 illustrates three exemplary scenes of different qualities and associated curves indicating the potential view synthesis quality as a function of the number of anchor images capturing the scene.

A simple scene 301 may have an appearance that varies little over angle and position. It may for instance contain matte painted surfaces and have little occlusions. Only few anchor image parts/images are required by the image rendering apparatus 101 in order to generate many different views of this simple scene. In contrast, a complex scene 303 will have an appearance that varies a lot with angle and position. It may for instance include specular and metallic elements or objects with self-occlusion such as a bowl of flowers. Many anchor image parts/images are required in order to capture such a complex scene and correspondingly a large number of anchor image parts are required by the image rendering apparatus 101 in order to generate different views. A typical scene 305 will be a combination of simple and complex parts, and capturing such a scene with a sufficient number of anchors required for a complex scene will result in a large redundancy. The described approach of adaptively selecting a subset of the available anchor image parts to include in the bitstream may substantially reduce the redundancy of the data included in the bitstream and thereby lower the bitrate substantially without a corresponding loss in the end quality. In many embodiments, the approach may lower the redundancy by splitting the anchor images into parts and deciding based on predictability, which images and image parts to transmit.

Figure 4:
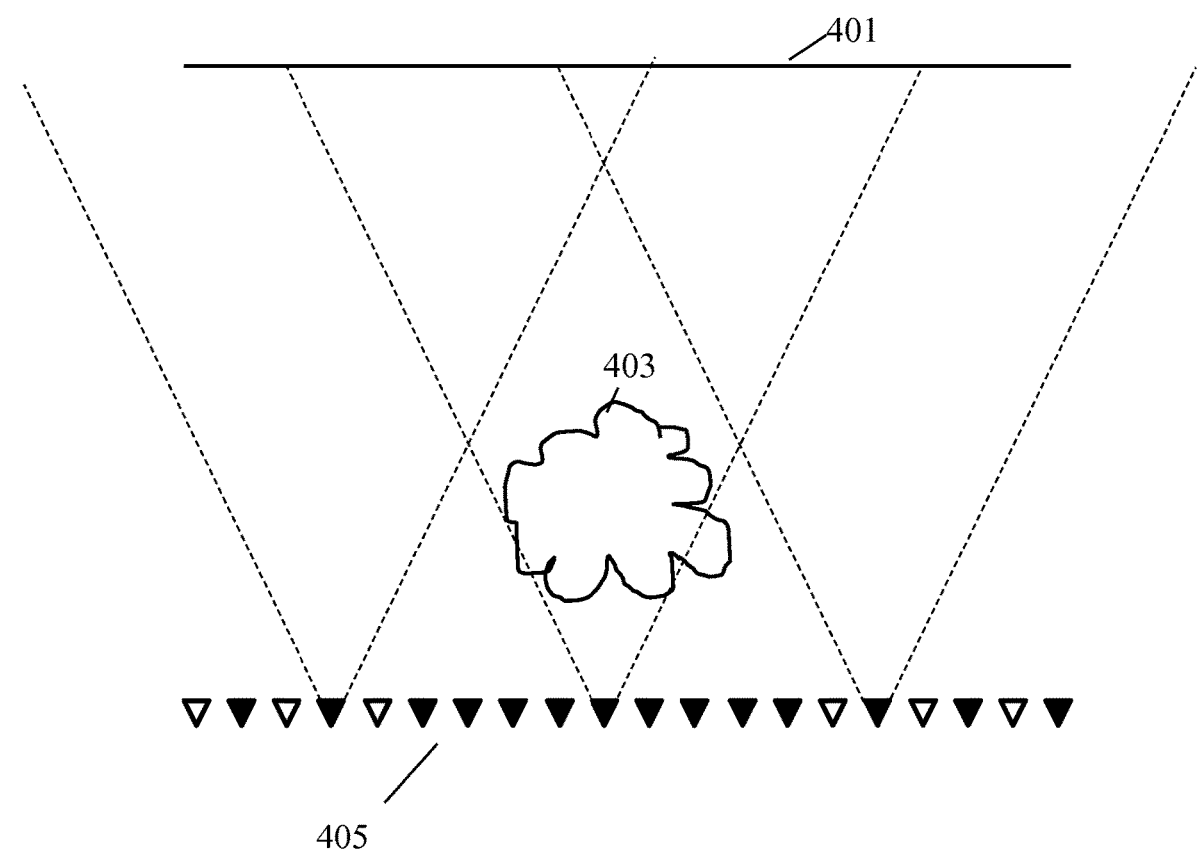
FIG. 4 illustrates an example of a selection of anchor image parts for a bitstream in accordance with some embodiments of the invention.

FIG. 4 illustrates an example of a scene with a distant background 401 and a foreground object 403. Images with depth are captured from a range of view poses 405 resulting in a set of anchor images/image parts for different view poses. In the example, a selective transmission strategy is employed where entire anchors may be skipped. The anchor images all image a background 401 at a large distance but the anchor images at the center of the array also include an object 403 at close distance in their field of view. This typically leads to the center images varying substantially more than the images towards the edges (the image of an irregular close by object changes substantially more for small viewpoint changes than an image of the background). Therefore, it is substantially more difficult to predict the center anchor images from neighbor anchor images than it is to predict edge anchor images from neighbor anchor images and accordingly the predictability measure for center images is substantially lower than for the edge images. Accordingly, a larger proportion of the center images (with associated depth maps) are included in the bitstream than for the edge images (the images included in the bitstream are in FIG. 4 indicated by the corresponding pose indication being filled in). The selector 205 is thus in this example arranged to select anchor images to include in the bitstream by varying the spatial sampling rate in response to the predictability measures for anchor images (and for the view poses of the anchor images).

Figure 5:
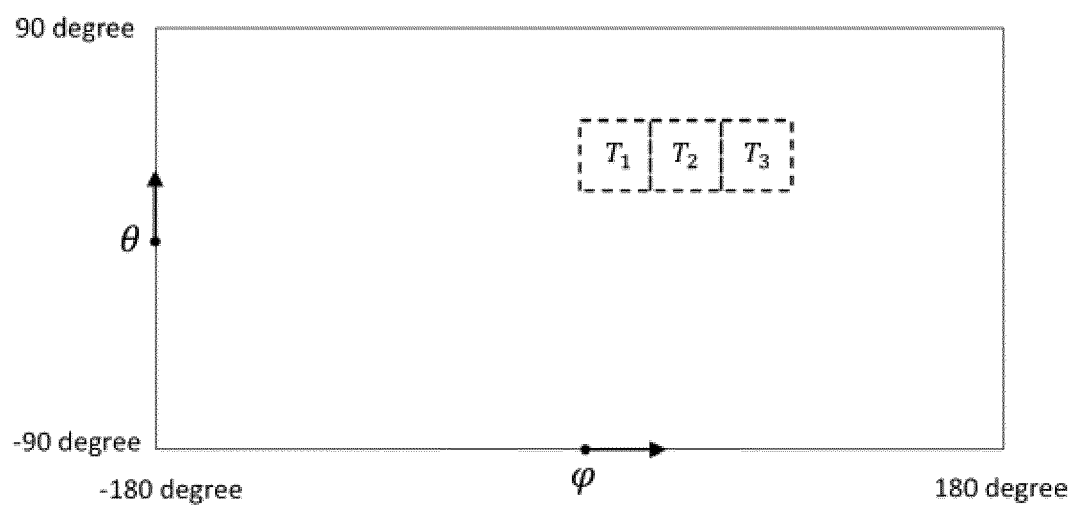
FIG. 5 illustrates an example of tiles of an image of a scene.
Figure 6:
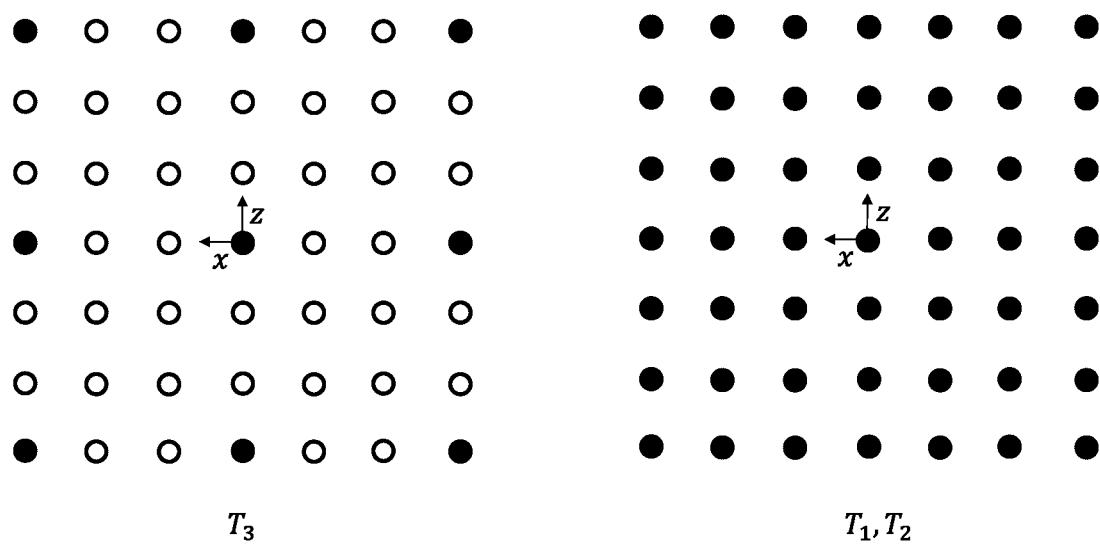
FIG. 6 illustrates an example of a selection of anchor image parts for a bitstream in accordance with some embodiments of the invention.

FIG. 5 shows an example of an application wherein an equirectangular image is generated at the image rendering apparatus 101 for virtual reality playback. The bitstream generating apparatus 103 provides image parts that are used to generate the equirectangular image and specifically the image parts may correspond to tiles of an image. Associated with each tile is also a depth map that is used for image based rendering. While the viewer changes position and orientation, tiles are streamed from the server/bitstream generating apparatus 103 to the viewer application at the image rendering apparatus 101. The spatial frequency of required anchor updates from the server varies per tile/viewing direction. This is illustrated in FIG. 6 which shows a horizontal grid of anchor poses/positions. In the example, the spatial density of provided anchor images varies for different tiles of the equirectangular image depending on the variations of the predictability measures for the tiles.

Figure 7:
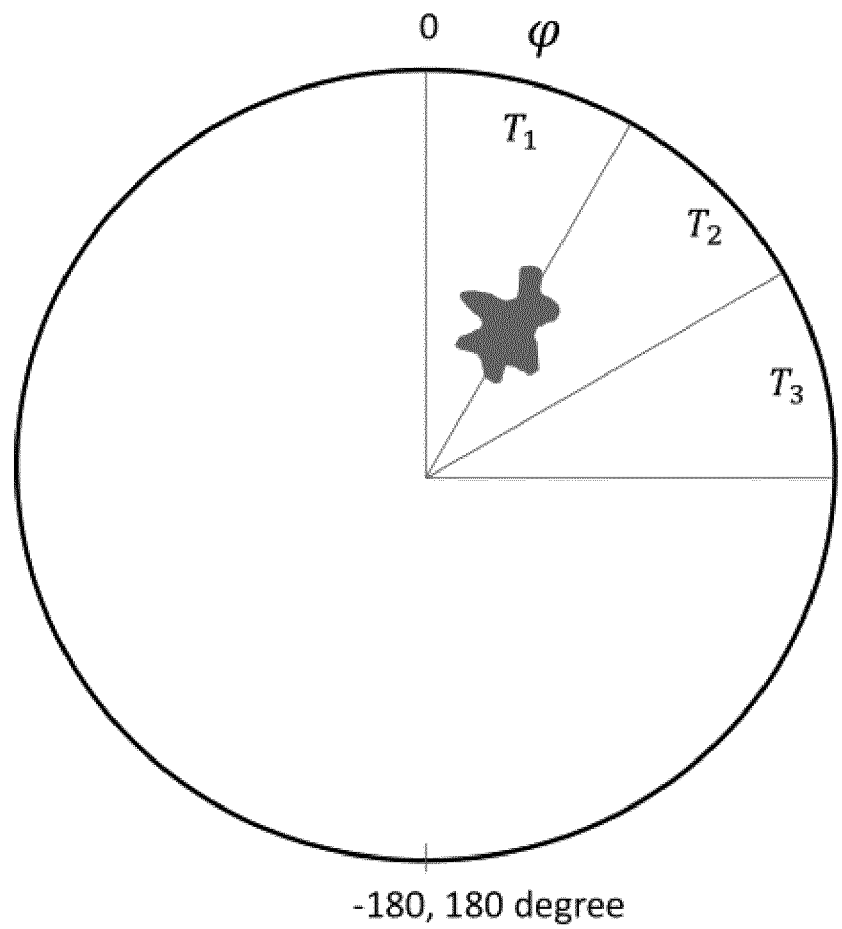
FIG. 7 illustrates an example of views of a scene.

For example, as illustrated in FIG. 7, for the current virtual user view pose, three (adjacent) tiles, $T_1$, $T_2$, $T_3$, of the equirectangular image/viewport correspond to slightly different (adjacent) viewing angle intervals. Two of these view intervals/tiles, $T_1$, $T_2$, include a close by irregular object whereas the third tile, $T_3$, does not. Accordingly, the bitstream generating apparatus 103 may generate predictability measures for image parts corresponding to the tiles, $T_1$, $T_2$, $T_3$, and will determine a lower predictability measure for the first two tiles, $T_1$, $T_2$, than for the last tile, $T_3$. Accordingly, it may proceed to determine that a higher spatial sampling density is required for the first two tiles, $T_1$, $T_2$, than for the third tile, $T_3$. Accordingly, for image parts corresponding to the first two tiles, $T_1$, $T_2$, all image parts may be included (corresponding to FIG. 6a) whereas for the third tile, $T_3$, only every third (in two directions) anchor image part is included (corresponding to FIG. 6b).

In some embodiments, the determination of which anchor images to include in the bitstream may be determined dynamically during the application. In other embodiments, an initial static determination may be performed based on an analysis of e.g. the scene, anchor images, and/or stored image parts.

In some such embodiments, the information about which anchors to retrieve from the server/bitstream generating apparatus 103 and which anchors to predict at the client/image rendering apparatus 101 may initially (at the start of the application) be communicated to the client side, e.g. in the form of a view map which indicates which image parts will (or may) be made available to the image rendering apparatus 101.

As indicated by the previous examples, different approaches and algorithms may be used to determine predictability measures for different image parts and poses.

The predictability measure may be indicative of the quality that can be achieved of newly synthesized images using depth image-based rendering (view synthesis) for a given view pose based on a subset of anchor images that do not include the anchor image for which the predictability measure is generated.

The predictability measure may be determined directly or indirectly by considering features or characteristics that reflect or influence the quality of a synthesized image.

In some embodiments where a more direct predictability measure may be determined, this may e.g. involve the bitstream generating apparatus 103 performing a view synthesis of an anchor image part and comparing the actual stored image part to the synthesized version. If the difference is small, the predictability measure is considered high. More specifically, a predictability measure may be determined as a view synthesis quality in terms of measured mean squared error, PSNR, VQM, MS-SSIM or another metric of the image part when predicted from one or more nearby image parts (typically in 6DoF space). Typically, this prediction is done using simulated renderings of the image part and depth map (or texture and mesh).

In other embodiments, a predictability measure may be generated in response to a consideration of a property of the scene. Specifically, in many embodiments, the predictability measure may be generated in response to an indication of a complexity of a scene. Specifically, a predictability measure may be generated based on the depth data for the image part. For example, if the depth data indicates that one or more objects are present which are relatively close, then it can be assumed that the image part includes an object that is difficult to predict from other anchor image parts for other (typically close by) view poses.

As a specific example, the predictability measure for an image part may be generated in response to the minimum depth (distance from camera/view point to object) that occurs in an image part. If all objects in an image part are far away from the camera, then a small (6DoF) motion of an observer will not change the relative texture inside an image part. The motion will result in an approximately affine transformation of the entire image part. For instance, the image part will rotate, shift or scale as a whole. This transformation is typically very well predictable from nearby images with depth at the client. Such a prediction may typically have such a high quality that view synthesis is sufficient and indeed that sending a residual signal is not needed.

A predictability measure may often be determined based on depth data, image data, or both depth data and image data. For example, if the depth data indicates that there is a large depth variation in the scene/depth data for the image part with e.g. relatively frequent and relatively steep step changes, it may consider this to be an indication of the scene/current view being complex and more difficult to predict. Similarly, if an image has a large variation in terms of image segments having very different visual properties with significant and sudden changes between segments, this may be seen as an indication of a high complexity of the scene, and thus be indicative of prediction being difficult. In contrast, if the depth and/or visual variation is low, the scene may be considered to have relatively low complexity and the predictability measure may be increased as it is likely that it will be possible to generate more accurate predicted images.

The approach may for example reflect that in scenes with a relatively large number of small objects, a higher number of captured poses are typically required than for scenes with few or no objects, and prediction is accordingly more difficult.

In some embodiments, the predictability processor 203 may specifically be arranged to determine the predictability measure in response to a depth variation of the depth data.

A depth variation estimate may be generated which seeks to reflect the presence (or not) of a number of depth transitions corresponding to the presence of a relatively high number of different objects at different depths. This may for example be achieved by identifying segments based on depth transitions in a depth map and then determining how many such segments are found. It will be appreciated that many other approaches may be used for determining suitable depth variation measures.

In some embodiments, the predictability processor 203 is arranged to determine the predictability measure in response to the distances to objects indicated by the depth data for the image part. Specifically, the predictability measure may be increased for an increasing distance to the objects.

This may reflect that the scene may be regarded as less complex when objects are relatively far from the camera as this typically provides improved visibility of different aspects and results in less changes when changing view pose. It also tends to result in less occlusion by the object of other parts of the scene. Therefore, prediction will typically be more accurate.

Similarly, the scene may be considered to be more complex when objects are relatively close to the camera as it requires more detailed captures to accurately reflect variations in the object and furthermore results in the object typically occluding a larger part of the scene thereby requiring additional anchor poses to allow de-occlusion. This may result in prediction being more difficult and inaccurate.

In some embodiments, the selector 205 may be arranged to further select the image parts to include in the bitstream in response to a visibility measure for image parts for a target view pose. The target view pose may specifically correspond to a view pose for which an image is to be synthesized by the image rendering apparatus 101, and may be provided dynamically from the image rendering apparatus 101 as will be described later.

The visibility measure may be indicative of whether the image part is visible for the target view pose and specifically whether it will be within a suitable view port for the target view pose. Specifically, the visibility measure for an image part may indicate how close the image part is to the viewport for the target view pose. If it is sufficiently close, or within, the viewport (and e.g. the predictability measure is sufficiently low), the image part is included in the bitstream. If it is too far from the viewport, it is not included.

This may provide improved performance in many scenarios. For example, it is very typical for a client to have viewports that are substantially smaller than the content. For instance, a headset may only have a 100 degree field of view while the content is 360 degree.

The viewport of the target view pose may typically be one for which an image is expected to be needed to represent a viewport. As a specific example, the selector 205 may consider the following rules for such a future viewport:

Parts that are almost certainly outside of the future viewport do not have to be transmitted.

Parts that are unlikely to be inside the future viewport and for which other parts will be available at the client, do not have to be transmitted.

Parts that are visible but predictable from another part that will be available at the client, do not have to be transmitted.

For any difficult to predict pixel in the image that is not certainly outside of the future viewport, at least one part from one anchor should be selected.

Different approaches may in different embodiments be used to select the prediction subset of image parts that form the basis of the determination of the predictability measure for a given pose/image part combination. In many embodiments, the prediction subset may be selected simply as a possibly predetermined number of anchor images or image parts that are closest to the given pose as these are typically the best candidates for prediction. In other embodiments, more complex and resource demanding approaches may be used. For example, prediction may be performed considering different possible sets of anchor image parts and the best prediction may be selected and the corresponding set of anchor image parts may be used.

In many embodiments, the prediction subset of anchor image parts is restricted to only include image parts that are comprised in the bitstream. Typically, the image parts considered are image parts that have previously been included in the bitstream but in some embodiments the prediction subset may also include image parts that have not yet been sent but which have been selected for inclusion in the bitstream (or which are selected together with the current image part due to being suitable as base images for prediction).

Such an approach may result in a very efficient bitstream generation where new image parts are essentially provided to the image rendering apparatus 101 when, and only when, it is not possible for the image rendering apparatus 101 to locally generate an image of sufficient quality based only on the image parts that are already available to the image rendering apparatus 101. Specifically, in such embodiments, the predictability measure may be indicative of the quality that can be achieved when synthesizing an image for a given pose based only on anchor image parts that are already present at the client/image rendering apparatus 101.

In many embodiments, the image rendering apparatus 101 may be arranged to generate the bitstream and select the image parts in response to a target view pose that is received by the bitstream generating apparatus 103 from the image rendering apparatus 101. Specifically, as the virtual user moves around in the virtual environment, the image rendering apparatus 101 may continuously transmit an indication of the current view pose as a target view pose (or e.g. may predict a target view pose in order to reduce the lag).

The bitstream generating apparatus 103 may receive the target view pose from the image rendering apparatus 101 and may proceed to select suitable image parts to include in the bitstream being streamed to the image rendering apparatus 101 based on the target view pose. Specifically, the bitstream generating apparatus 103 may determine a predictability measure for the target view pose which indicates how well an image for a viewport corresponding to the target view pose can be generated based on image parts that have already been transmitted to the image rendering apparatus 101, and which thus are already available for view/image synthesis at the image rendering apparatus 101.

If the predictability measure is indicative of the prediction quality being sufficiently high, no further image part is added to the bitstream for the current target view pose (e.g. unless a buffer of image parts to be transmitted to the image rendering apparatus 101 is sufficiently empty). However, if the predictability measure is indicative of the prediction quality not being sufficiently high, one or more image parts are added to the bitstream. In some embodiments, a predetermined selection may be used, e.g. the nearest image part (or image parts) may be added (and thus the predictability measure may be considered to be generated for this (these) image part(s)). The approach may then potentially be iterated while including image part(s) selected in a previous iteration in the prediction set for the current iteration. In other embodiments, the bitstream generating apparatus 103 may generate a predictability measure based on including different image parts and may then select the image part(s) that result in the highest predictability measure.

It will be appreciated that the image parts may be different things in different embodiments. For example, in some embodiments, each image part may be an entire captured image (including potentially an entire full hemispherical image).

In many embodiments, the image parts may be partial views, such as specifically image segments corresponding to relatively low viewing angle intervals, such as e.g. in the 10° to 45° range (e.g. in both the horizontal and vertical direction). For example, a rectangular image corresponding to a rectangular viewport for a given view pose may be divided into a plurality of image parts which can individually be selected for inclusion in the bitstream (e.g. the tiles in the example of FIG. 5).

In some embodiments, the image parts may correspond to a predetermined partitioning of the images. For example, as in the example of FIG. 5, a rectangular image may be divided into a predetermined plurality of square tiles with each square corresponding to an individually selectable image part. As a specific example, each image part may be an encoding block image, such as e.g. a 16×16 pixel macroblock.

Such an approach may allow a low complexity implementation which however may still provide excellent performance.

In some embodiments, the image parts (or at least some image parts) may be faces of polyhedral projections of the scene for different view poses, such as for example squares in a cube map or the triangles in an icosahedron.

Specifically, for a given view point, the hemispherical view may be divided into a set of corresponding planar polygons that together form a hemispherical geometric construction. This will in many embodiments facilitate the view synthesis operations and furthermore will facilitate integrating new image parts being received with previously received or predicted image parts. Compared to equirectangular projection, and due to polyhedral projections having flat faces, it is cheaper to render an image on a standard GPU because a low number of triangles can accurately describe the shape that is associated with the projection. For polyhedral projections with sufficient number of faces (like the icosahedral projection) the average projection distortion is lower than for equirectangular projection. Furthermore, the faces provide a natural partitioning of the image.

In some embodiments, the bitstream generating apparatus 103 may comprise a partitioner 209 which is arranged to generate at least some image parts by partitioning anchor images. In some embodiments, this partitioning may be predetermined, e.g. the partitioner 209 may partition the image using a regular tiling.

However, in many embodiments, more freely shaped partitions or segments may be generated, and in particular the generation of image parts may be by a segmentation which depends on the properties of the image and/or depth map. This may for example allow specific objects to be represented by different image parts, the background by another individual image part etc.

Indeed, it may often occur that an image consists of a background and a few foreground objects. It is advantageous that a foreground object plus a rim of background is contained within an image part, because foreground objects are typically less predictable than background objects. More generally, a good image part for selection has low internal predictability and high predictability near the part edges.

Accordingly, by segmenting an image into suitable image parts, a particularly efficient operation can be achieved.

It will be appreciated that any suitable approach for image segmentation may be used without detracting from the invention. For example, segments may be generated to have consistent colors and/or intensities, or to correspond to recognized object images such as faces, or e.g. segments may be generated to correspond to areas having similar depth values etc. It will be appreciated that a large number of segmentation algorithms and criteria will be known to the skilled person.

In many embodiments, the selector 205 is arranged to select a plurality of contiguous image parts in response to a determination that the plurality of contiguous image parts form a region having a prediction quality measure below a first threshold for an interior part of the regions and a prediction quality measure above a second threshold for a border part of the region (where the first threshold in many embodiments may be lower than the second threshold).

In many such approaches, having low predictability on the edge of an image part will result in an adjacent image part also being selected when that edge is within the desired viewport. This may avoid or mitigate rendering artefacts on the edge of the part being rendered using the image part with low edge predictability. In this way, image parts may link to form groups which may have a low internal predictability but which have a high external (edge) predictability.

Figure 8:
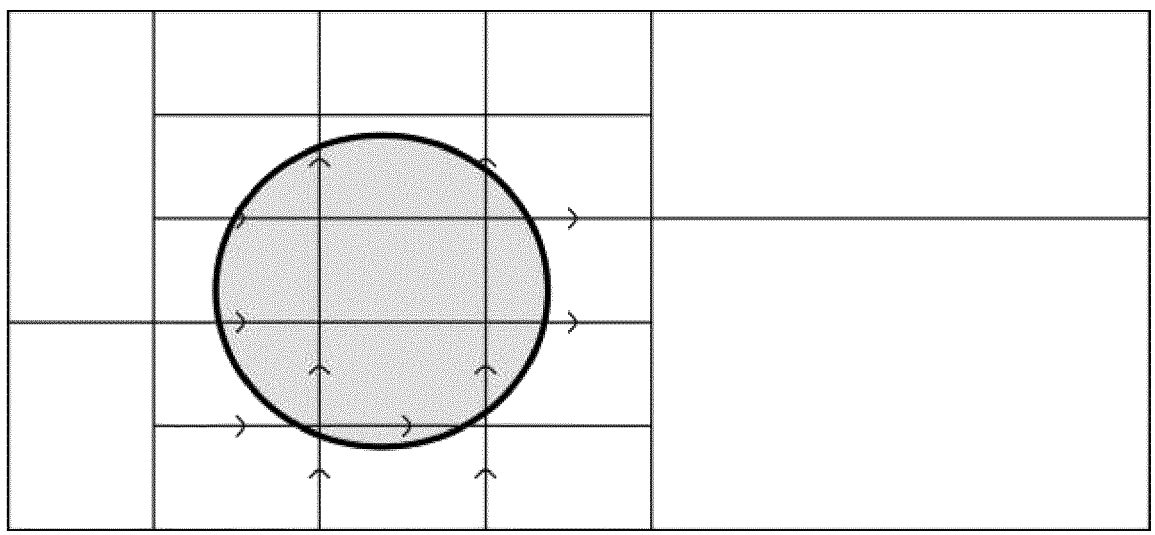
FIG. 8 illustrates an example of a selection of anchor image parts for a bitstream in accordance with some embodiments of the invention.

Such an approach may be illustrated by the example of FIG. 8 which illustrates a tiled image of a sphere where each tile corresponds to an image part. Tiles that share an edge that runs through low-predictable pixels are linked. Any two parts that share an edge through a low-predictable region have a linked selection criterion such that either all of the image parts are transmitted or none are transmitted.

In some embodiments, the bitstream generating apparatus 103 may specifically consider predictability at the edges when determining whether to link image parts or not. However, in other embodiments, the selection may be based only on considering predictability measures for the entire image part. For example, if the predictability measure for a given image part is below a given threshold (meaning that it is difficult to predict) all adjacent image parts are also included. This approach may be iterated resulting in image parts being included until these have a high predictability measure. This will result in an effective generation of a larger image part with low internal predictability and high edge predictability by the grouping of the original image parts.

In some embodiments, at least some image parts are overlapping.

In many embodiments, it may be beneficial to allow for overlapping image parts such that two adjacent image parts both include image data for an overlapping border region. This may result in an increased storage demand for the bitstream generating apparatus 103 and may increase the data rate of the bitstream. However, in many embodiments, it may allow for an improved coding efficiency (e.g. if the coding blocks do not align with borders between image parts). Furthermore, the overlapping regions may substantially facilitate the blending of a new image part with other image parts that e.g. may be predicted or previously generated at the image rendering apparatus 101.

Although the previous description has focused on a representation using standard images and depth maps, it will be appreciated that in other embodiments other approaches may be used.

For example, the images may comprise texture atlas images that include texture parts from mesh and texture representations of the scene. An example of such a representation may e.g. be found in A. Collet et al. High-quality streamable free-viewpoint video. ACM Transactions on Graphics (TOG), Proceedings of ACM SIGGRAPH 2015. Volume 34 Issue 4, August 2015.

In such an example, an anchor image may correspond to a texture atlas that is most suitable for viewing from the anchor position (region). A texture atlas combined with a (disjoint) mesh may form a geometrical model of an object or scene. In this case, an image part may for instance be one texture in such an atlas that corresponds to one surface in a scene.

As a specific example, a scene may contain some objects with low predictability, e.g. a specular object such as a metal luminaire or an object with self-occlusion such as a bowl of flowers. The bitstream generating apparatus 103 may divide anchor image parts into different levels. Level 0 anchor image parts may contain all objects in the scene including the background so at least one level 0 anchor (geometry model) will be streamed. When the viewer navigates through space, the level 0 anchor selection will change.

In addition, in order to take the angular dependency of the appearance of some objects into account, higher-level anchors may contain partial scene models. Even so, only part of such an anchor may be streamed based on the viewer position. This decision is based on the predictability of the parts in the level 1+ anchors.

In some embodiments, the image parts (or at least some of them) may be pre-encoded. Thus, they may be encoded and stored in a format wherein they can be directly included in the bitstream without any requirement for transcoding or (re)encoding. Rather, an image part that is to be included in the bitstream may simply be retrieved from the store 201 and added to the bitstream with no encoding operation. This may very substantially reduce the complexity and resource requirements at the bitstream generating apparatus 103 and provide for very efficient operation.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way.

The invention claimed is:

1. An apparatus for generating an image data bitstream, the apparatus comprising:
    a storage circuit,
        wherein the storage circuit is arranged to store a set of image parts and associated depth data,
        wherein the set of image parts and associated depth data represent a scene from different view poses;
    a predictability processor circuit,
        wherein the predictability processor circuit is arranged to generate at least one predictability measures for image parts of the set of image parts for view poses of the scene,
        wherein a first predictability measure for a first image part for a first view pose is indicative of an estimate of a prediction quality for a prediction of at least part of an image,
        wherein the part of an image is a viewport of the first view pose from a first subset of image parts of the set of image parts,
        wherein the set of image parts do not include the first image part;
    a selector circuit,
        wherein the selector circuit is arranged to select a second subset of image parts of the set of image parts in response to the predictability measures,
        wherein the selector circuit is arranged to select a plurality of image contiguous parts in response to a determination,
        wherein the determination is that the plurality of contiguous image parts form a region having a prediction quality measure below a first threshold for an interior part of the regions and a prediction quality measure above a second threshold for a border part of the region; and
    a bitstream generator circuit,
        wherein the bitstream generator is arranged to generate the image bitstream,
        wherein the image bitstream comprised image data and depth data from the first subset of image parts.

2. The apparatus of claim 1, wherein the predictability processor circuit is arranged to generate the first predictability measure as indicative of a prediction quality of a prediction of the first image part.

3. The apparatus of claim 1, wherein the first subset of image parts includes only image parts included in the bitstream.

4. The apparatus of claim 1, wherein the selector circuit is arranged to select the second subset of image parts in response to a visibility measure for the set of image parts for a target view pose.

5. The apparatus of claim 1, wherein the image parts are pre-encoded image parts.

6. The apparatus of claim 1, wherein the set of image parts comprises faces of polyhedral projections of the scene for different view poses.

7. The apparatus of claim 1, wherein the image parts correspond to a predetermined partitioning of the images.

8. The apparatus of claim 1, further comprising a partitioner circuit,
    wherein the partitioner circuit is arranged to generate at least some image parts of the set of image parts in response to a partitioning of images,
    wherein the partitioning of images is based on at least one of pixel values of the images and depth values for the images.

9. The apparatus of claim 1,
    wherein at least some image parts of the set of image parts are image parts of a texture atlas image,
    wherein the texture atlas image includes texture parts from mesh and texture representations of the scene.

10. The apparatus of claim 1, wherein the selector circuit is arranged to select image parts for the second subset of image parts in response to a target view pose received from a remote source.

11. The apparatus of claim 1, wherein at least some image parts are overlapping.

12. The apparatus of claim 1, wherein the predictability processor circuit is arranged to generate the first predictability measure in response to the associated depth data for the first image part.

13. A method of generating an image data bitstream, the method comprising:
    storing a set of image parts and associated depth data,
        wherein the set of image parts and associated depth data represents a scene from different view poses;
    generating predictability measures for image parts of the set of image parts for view poses of the scene, wherein a first predictability measure for a first image part for a first view pose is indicative of an estimate of a prediction quality for a prediction of at least part of an image, wherein the part of an image is a viewport of the first view pose from a first subset of image parts of the set of image parts not including the first image part;

selecting a second subset of image parts of the set of image parts in response to the predictability measures, wherein the selecting is arranged to select a plurality of image contiguous parts in response to a determination, wherein the determination is that the plurality of contiguous image parts form a region having a prediction quality measure below a first threshold for an interior part of the regions and a prediction quality measure above a second threshold for a border part of the region; and generating the image bitstream comprising image data and depth data from the first subset of image parts.

14. A computer program stored on a non-transitory medium, wherein the computer program when executed on a processor performs the method as claimed in claim 13.

15. The method as claimed in claim 13, wherein the generating the first predictability measure is indicative of a prediction quality of a prediction of the first image part.

16. The method as claimed in claim 13, wherein the first subset of image parts includes only image parts included in the bitstream.

17. The method as claimed in claim 13, wherein the selecting is arranged to select the second subset of image parts in response to a visibility measure for the set of image parts for a target view pose.

18. The method as claimed in claim 13, wherein the image parts are pre-encoded image parts.

19. The method as claimed in claim 13, wherein the set of image parts comprises faces of polyhedral projections of the scene for different view poses.

* * * * *